(12) United States Patent
Vinayagam et al.

(10) Patent No.: US 7,881,230 B2
(45) Date of Patent: Feb. 1, 2011

(54) FACILITATING SELF CONFIGURING LINK AGGREGATION USING LINK AGGREGATION CONTROL PROTOCOL

(75) Inventors: Anand Vinayagam, Northridge, CA (US); Vincent Magret, Oak Park, CA (US)

(73) Assignee: Alcatel Lucent, Paris (FR)

( * ) Notice: Subject to any disclaimer, the term of this patent is extended or adjusted under 35 U.S.C. 154(b) by 280 days.

(21) Appl. No.: 11/980,027

(22) Filed: Oct. 29, 2007

(65) Prior Publication Data

US 2009/0109998 A1 Apr. 30, 2009

(51) Int. Cl.
*H04L 12/28* (2006.01)
(52) U.S. Cl. .................................. 370/255; 370/395.3
(58) Field of Classification Search .................. 370/2, 370/255, 386, 474, 395.3, 216, 235, 252, 370/401; 709/236, 224, 238
See application file for complete search history.

(56) References Cited

U.S. PATENT DOCUMENTS

| | | | | |
|---|---|---|---|---|
| 6,631,141 B1 * | 10/2003 | Kumar et al. | ............... | 370/469 |
| 6,804,721 B2 * | 10/2004 | Wils et al. | ................... | 709/230 |
| 6,910,149 B2 * | 6/2005 | Perloff et al. | .................. | 714/4 |
| 2002/0105949 A1 * | 8/2002 | Shinomiya | .................. | 370/386 |
| 2002/0110148 A1 * | 8/2002 | Hickman et al. | ............ | 370/475 |
| 2004/0133693 A1 * | 7/2004 | Wils et al. | ................... | 709/230 |
| 2008/0215910 A1 * | 9/2008 | Gabriel et al. | ................. | 714/4 |

* cited by examiner

*Primary Examiner*—Aung S Moe
*Assistant Examiner*—Awet Haile
(74) *Attorney, Agent, or Firm*—Galasso & Associates, LP

(57) ABSTRACT

A switch discovers active neighboring peer devices of a switch. Such discovery includes facilitating communication of Link Aggregation Control Protocol Data Units (LACP-DUs) for identifying a unique peer identifier assigned to each one of the neighboring peer devices. In response to discovering the active neighboring peer devices, the switch automatically assigning a link aggregation key to each one of a plurality of physical links over which the switch and one of the active neighboring peer devices communicate respective ones of the LACPDUs. Thereafter, the switch facilitates logically aggregation all of the physical links dependent upon the link aggregation key.

16 Claims, 3 Drawing Sheets

Switch C
Link Aggregation Table — 150

Link Aggregation 1
System (Peer) ID: M1

Key: C-A port 1 port 2 port 3

Link Aggregation 2
System (Peer) ID: M2

Key: C-B port 4 port 5

FACILITATING SELF CONFIGURING LINK AGGREGATION USING LINK AGGREGATION CONTROL PROTOCOL

FIELD OF THE DISCLOSURE

The disclosures made herein relate generally to network switch management and, more particularly, to facilitating automated management of switch link aggregation.

BACKGROUND

In data networks, devices such as data switches, servers and routers, are at times connected to each other via multiple parallel Ethernet links. Such devices that provide switching functionality are universally referred to herein as switches. While additional links provide additional signal paths for Ethernet traffic between two points, link aggregation, or trunking, can be performed to more fully realize the benefits of link parallelism. Standards developed by the Institute of Electrical and Electronics Engineers (IEEE) in IEEE Standard 802.3ad allows one or more links to be aggregated in such a way that the group can be treated as if were a single link (i.e., a logical link).

In IEEE 802.3 ad, or Link Aggregation Control Protocol (LACP), candidates for aggregation are identified and the protocol is enabled for these links. LACP is defined in such a manner that the negotiation and exchange of parameters between interconnected data devices is automatic once enabled. There are various benefits to using LACP for link aggregation. These include improved link capacity, cost effective hardware upgrade path, and enhanced communications reliability. Link capacity is improved because the bandwidth of the new, single "logical" link is effectively the sum of the bandwidths of the individual links. A data stream can be split up and distributed amongst the grouped ports in a switch, thus decreasing bottlenecks in this part of the network. Furthermore, by using LACP on existing switch and network hardware one may find an intermediate capacity that falls between standard LAN data rates, such as 10 Mb/s, 100 Mb/s, and 1000 Mb/s. Leveraging existing equipment in this manner precludes the need to make 10× jumps, for example, in network capacity (i.e. 10 Mb/s to 100 Mb/s) This flexibility also enables aggregated links to exceed the throughput of current state-of-the art LAN technologies while utilizing established, well characterized, reliable and cost effective current generation network hardware. Finally, communications reliability is achieved by virtue LACP's ability to maintain a connection despite the loss of any single physical data link. In the event of a downed link, the available throughput of the aggregated ports may be diminished but data flow can remain active.

Despite the aforementioned benefits of using LACP between network switches, the manual configuration that is required to identify candidates for link aggregation remains an impediment to a fully self-configuring network with respect to physical and logical links. Although the negotiation between network devices that have LACP enabled is automatic, human interaction with the device's firmware settings is still a necessity and reduces efficiency, practicality, reliability, and simplicity of network infrastructure deployment. More specifically, the current implementation of LACP in switches requires the administrator to specify the port(s) that are aggregated together and to specify a key that will be used to identify the sender on the remote end switch. Additionally, differences in user training and expertise may lead to inconsistent arrangements, and non-ideal configurations.

Therefore, facilitating link aggregation in a self-configuring manner using IEEE 802.3ad Link Aggregation Control Protocol such that drawbacks and inefficiencies associated with the conventional manual configuration required when using IEEE 802.3ad Link Aggregation Control Protocol would be advantageous, desirable and useful.

SUMMARY OF THE DISCLOSURE

Embodiments of the present invention enable efficient, consistent and repeatable automatic configuration of aggregated switch links according the IEEE 802.3ad Link Aggregation Control Protocol specification. More specifically, embodiments of the present invention are able to discover (i.e., detect) the existence of partner (i.e., peer) devices with which an aggregated link connection can be made. Furthermore, embodiments of the present invention configure and actively manage such aggregated links in an automated manner during the continued operation of the network device. In doing so, embodiments of the present invention advantageously overcome one or more shortcomings associated with conventional manual configuration of aggregated physical links.

In one embodiment of the present invention, a method allowing a switch to self-configure a logical connection corresponding to a plurality of physical links comprises a plurality of operations. An operation is performed for receiving Link Aggregation Control Protocol Data Units (LACPDUs) from a plurality of peer devices. Receiving the LACPDUs is performed by a switch connected via a plurality of physical links to each one of the peer devices. Each one of the LACPDUs includes a peer identifier that uniquely identifies the respective peer device relative to each other peer device connected to the switch and a switch identifier that identifies the switch. In response to receiving each one of the LACPDUs, an operation is performed for automatically assigning a link aggregation key to a physical link used by the switch for receiving a respective one of the LACPDUs.

In another embodiment of the present invention, a method for causing a switch to self-configure a logical connection thereof corresponding to a plurality of physical links thereof comprises a plurality of operations. An operation is performed for discovering active neighboring peer devices of a switch. Discovering the active neighboring peer devices includes facilitating communication of LACPDUs to identify a unique peer identifier assigned to each one of the neighboring peer devices. In response to discovering the active neighboring peer devices, an operation is performed for automatically assigning a link aggregation key to each one of a plurality of physical links over which the switch and one of the active neighboring peer devices communicate respective ones of the LACPDUs. After assigning the link aggregation key, an operation is performed for logically aggregating all of the physical links dependent upon the link aggregation key.

In still another embodiment of the present invention, a switch is capable of self-configuring a logical connection thereof corresponding to a plurality of physical links thereof. The switch discovers active neighboring peer devices of a switch. Such discovery includes facilitating communication of Link Aggregation Control Protocol Data Units (LACPDUs) for identifying a unique peer identifier assigned to each one of the neighboring peer devices. In response to discovering the active neighboring peer devices, the switch automatically assigning a link aggregation key to each one of a plurality of physical links over which the switch and one of the active neighboring peer devices communicate respective ones of the LACPDUs. Thereafter, the switch facilitates logical aggregation all of the physical links dependent upon the link aggregation key.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
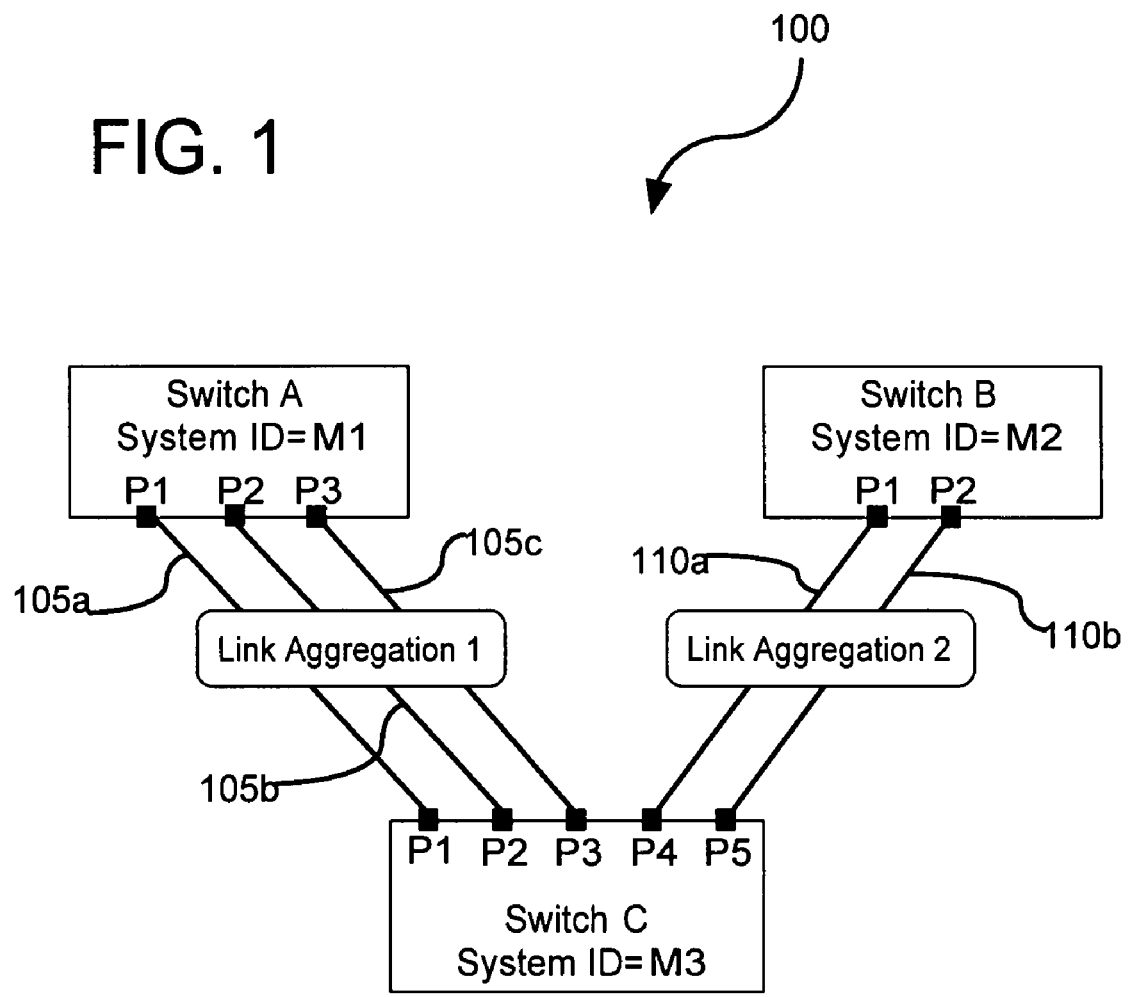
FIG. 1 is a block diagram showing a network of self-configuring switches in accordance with an embodiment of the present invention.

In a self-configuring network in accordance with an embodiment of the present invention, switches with multiple physical links to its neighbors have an automated way of aggregating the multiple connections of a given peer device to one logical connection. Furthermore, such a self-configuring switch uses Link Aggregation Control Protocol (LACP) data units (i.e., LACPDUs) to automatically and dynamically discover its neighbors and continually attempts to automatically and dynamically aggregate multiple physical ports and associated physical links (i.e., links) with a particular neighbor to one logical port without any user aggregation configuration. In this manner, self-configuring network in accordance with an embodiment of the present invention allows the switch and respective peer device to take advantage of known benefits associated with link aggregation. This functionality is referred to herein as self-configuring link aggregation, and an LACP engine can be configured for performing such functionality. The term 'automatically' refers to actions taken without human intervention initiating such actions. The term dynamically refers to actions being performed dependent upon non-static parameters (e.g., network conditions, peer device conditions, switch conditions, link conditions, prescribed timelines, etc).

Aggregation in accordance with the present invention is performed without user explicitly grouping ports together. To this end, such a switch is configured to have LACP active on all appropriate ports of the switch by default, whereby the switch is rendered self-configured from a link aggregation point of view and any port of the switch is a candidate to be a member of a link aggregate. It is disclosed herein that LACP data units are sometimes referred to as LACP control packets.

With respect to a switch (i.e., a self-configuring switch) being configured to have LACP active on all appropriate ports of the switch, in one embodiment, such appropriate ports are all active ports of the switch. In another embodiment, the switch has ports profiled as user ports and network ports. The user ports connect to user terminals and the network ports connect to neighboring switches. All the user ports have common and minimum configuration characteristics and, in a similar way, all the network ports have common characteristics. Accordingly, in an embodiment of a self-configuring switch where the ports are so profiled, such appropriate ports are all active network ports of the switch.

As disclosed above, a switch in accordance with an embodiment of the present invention enables LACP on all the ports by default. Because one or more ports of the switch are connected to some peer devices that will not respond to a LACPDU, self-configuring link aggregation functionality in accordance with the present invention can automatically disable LACP functionality (i.e., an LACP engine) on such one or more ports on which no LACPDU has been received within a predefined timeframe as well as a port or ports that has been administratively disable or subject to a link down event. Inversely, self-configuring link aggregation functionality in accordance with the present invention can automatically re-enable LACP on such one or more ports in response to reception of a LACPDU, a previously disabled link being administratively re-enabled, or a link previously subjected to a link-down event being subsequently subjected to a link up event.

In a conventional sense, LACPDUs carry information that is used for aggregating a plurality of physical links of a switch to one logical group. Examples of such parameters include an Administrative Key, an Operational Key and a system identifier. The Operational Key is the key that is used for the purposes of forming aggregations in that ports and the associated links are assigned the same operational key. The administrative key allows manipulation of key values by an administrator or other authorized entity. The administrative and operational keys assigned to a port may differ. A given key value is meaningful only in the context of the system that allocates it (i.e., there is no global significance to key values).

In the case of a self-configuring switch in accordance with an embodiment of the present invention, LACP is modified such that all information carried by a LACPDU other than the system identifier of a respective neighboring peer device is ignored during discovery of such neighboring peer device. The system identifier is a globally unique identifier to the switch, which is the concatenation of a globally administered individual MAC address and the system priority. Accordingly, each switch in the network is identified by its respective unique system identifier.

LACPDU driven discovery in accordance with embodiments of the present invention precludes an administrator from having to manually and explicitly group ports. An LACPDU used for such discovery purposes is referred to herein as a discovery LACPDU. Through assessment of system identifiers derived from discovery LACPDUs received at respective ports of a switch from its peer device uniquely identifies all the ports of the switch that are connected to a given peer device. In response to communicating LACPDUs and discovering neighboring peer devices through such LACPDU communication, appropriate ports of the switch (e.g., network-profiled ports) run LACP once a respective link with the discovered neighboring peer device is detected operational with a system identifier set to its unique MAC address and all other parameters which are used for the selection of a port to a particular aggregator are set to default. Accordingly, self-configuring link aggregation functionality in accordance with embodiments of the present invention allows a switch to automatically facilitate link aggregation.

Referring now to FIG. 1, a network 100 includes a plurality of switches. A first one of the switches (i.e., switch A) and a second one of the switches (i.e., switch B) are both connected to a third one of the switches (i.e., switch C) through a respective plurality of physical links. System identifiers (M1, M2, and M3) uniquely identify the switch (A, B, and C, respectively). A first plurality of links (i.e., physical links 105*a*, 105*b* and 105*c*) is connected between switch A and switch C, and a second plurality of links (i.e., physical links 110*a* and 110b) is connected between switch B and switch C. Thus, switch C and switch A can potentially aggregate three physical links between them to one logical link (i.e., link aggregation 1) and, similarly, switch C and switch B can potentially aggregate two physical links to one logical link (i.e., link aggregation 2).

On Switch C, LACPDUs received at ports connected to Switch A (i.e., port P1, port P2, and port P3) include a common system identifier (i.e., M1) and LACPDUs received at ports connected to Switch B (i.e., port P4 and port P5) include a common system identifier (i.e., M2). With respect to facilitating self-configuring link aggregation functionality in accordance with embodiments of the present invention, switch C will initially build a given operational key that will be transmitted within a LACPDU on all ports (i.e., port P1-port P5). For each LACPDU received on a port of switch C, the LACP engine of switch C is then able to determine the corresponding peer device based on the system identifier carried by the received LACPDU. Thereafter, the LACP engine assigns a new key for each link aggregate it has discovered. More specifically, the LACP engine of switch C transmits a LACPDU (i.e., Peer Discovery LACPDU) on all of its active links with a system identification: M3 and a key: C. Once a respective LACPDU has been received by the LACP engine of switch C switch from a peer device (i.e., a Discovery Reply LACPDU), the LACP engine of switch C identifies the originator of such received Discovery Reply LACPDU by means of the system identifier in the Discovery Reply LACPDU. Then, based on the system identifier in the Discovery Reply LACPDU, the LACP engine of switch C assigns a new key for this peer device. Selection logic of the LACP engine of switch C aggregates all the ports with common system identifier as one logical port. Accordingly, Switch C will have two link aggregates: one with Switch A and one with Switch B. Correspondingly, Switch A and Switch B will each have one respective link aggregation with Switch C. The selection logic works solely on based of the system identifier received in the LACPDUs. All other selection parameters are ignored to avoid any user configuration.

Figure 2:
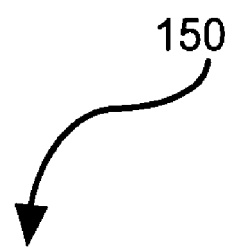
FIG. 2 shows a Switch Link Aggregation Table and constituent information in accordance with an embodiment of the present invention.

Referring to FIGS. 1 and 2, the Switch C Link Aggregation Table 150 includes Link Aggregation 1 and Link Aggregation 2. For the first plurality of physical links (105a-105c), which extend between Switch A (i.e., system identifier M1) and Switch C (i.e., system identifier M3), it can be seen that the LACP engine of switch C assigns key C-A to such physical links. As such, Link Aggregation 1 is designated as corresponding to key C-A and including physical links connected to ports P1, P2 and P3 of switch C. Key C-A is used for all physical links that connect between switch C and Switch A. Similarly, for the second plurality of physical links (105a-105c), which extend between Switch B (i.e., system identifier M2) and Switch C (i.e., system identifier M3), it can be seen that the LACP engine of switch C assigns key C-B to such physical links. As such, Link Aggregation 2 is designated as corresponding to key C-B and including physical links connected to ports P4 and P5 of switch C. Key C-B is used for all physical links that connect between switch C and Switch B.

If more than one link aggregation is needed between two switches, then manual or automated configuration can be used to distinguish the ports connected to each aggregation or to specify a known limit to maximum number of ports associated with a given aggregation (i.e., available for serving the given aggregation). Such a limitation can be a hardware limitation in that, for example, integrated circuit components used in a switch can have its own limitation in term of number of ports part of a link aggregation. If the known per-aggregation port limitation is reached and still there are more unused ports connected between the switches, then the switch can generate automatic aggregation keys (i.e., identifiers) to distinguish between the aggregators.

Figure 3:
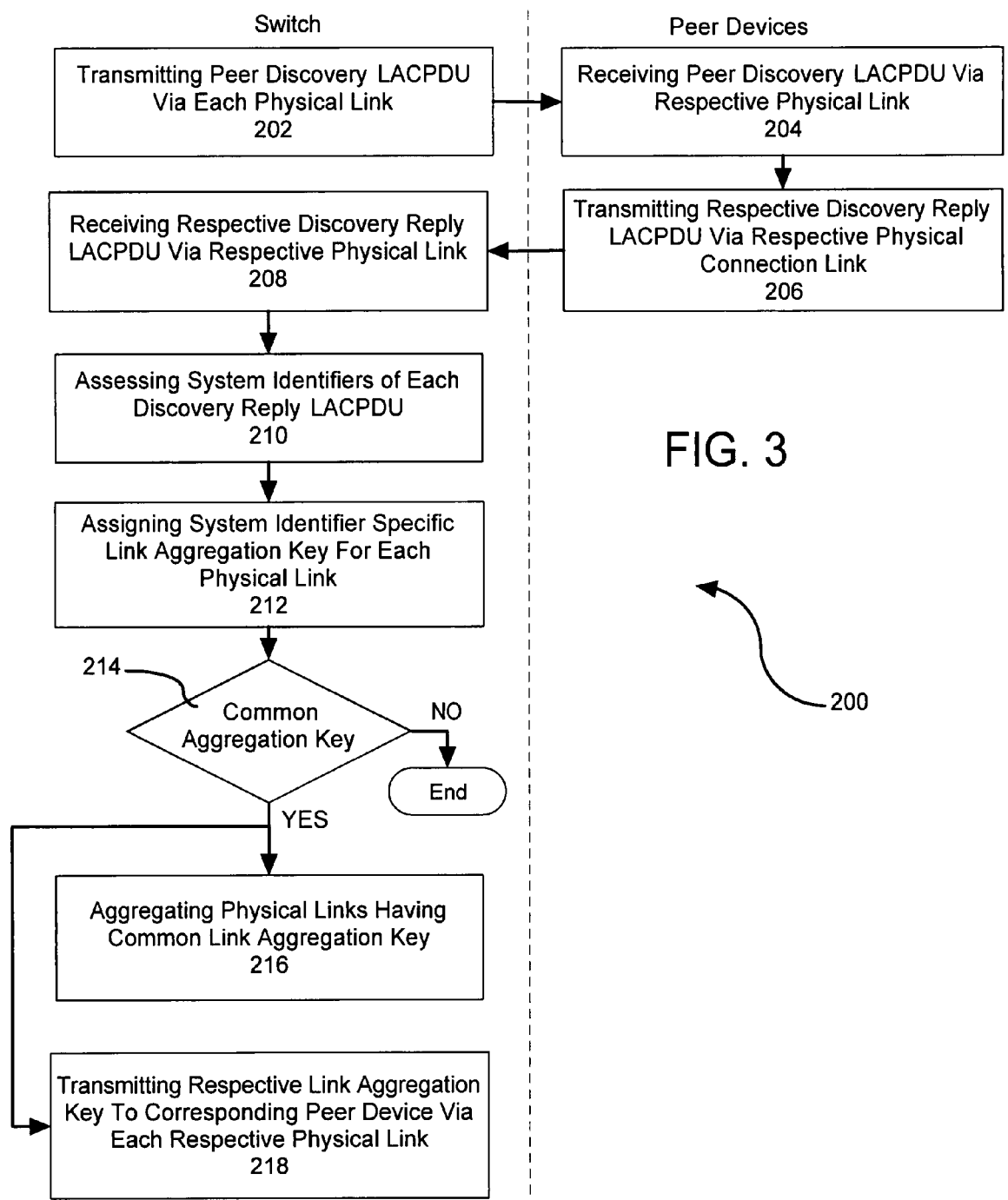
FIG. 3 shows a method for facilitating self-configuring link aggregation functionality in accordance with an embodiment of the present invention.

Referring now to FIG. 3, a method 200 for facilitating self-configuring link aggregation functionality in accordance with an embodiment of the present invention is shown. A switch performs an operation 202 for transmitting Peer Discovery LACPDUs via each appropriate physical link thereof (i.e., physical links associated with network configured ports thereof). In response to peer devices (i.e., active peer devices) performing respective operations 204 for receiving the Peer Discovery LACPDUs on respective physical links, the peer devices each perform an operation 206 for transmitting Discovery Reply LACPDUs for reception by the switch via respective physical links.

In response to the switch performing an operation 208 for receiving the Discovery Reply LACPDUs at respective ports of the switch, the switch performs an operation 210 for assessing a system identifier contained by each one of the Discovery Reply LACPDUs. Through such assessment, the switch is able to determine the peer device that sent each one of the Discovery Reply LACPDUs. In conjunction with such assessment (e.g., during or after such assessment), the switch performs an operation 212 for assigning a system identifier specific link aggregation key (i.e., an operational type key) to each port that received a respective one of the Discovery Reply LACPDUs. In this manner, each physical link over which each one of the Discovery Reply LACPDUs of the switch was transmitted has a respective system identifier specific link aggregation key associated therewith. The switch performs an operation 214 for determining if any of the physical links have common aggregation keys. In response to none of the physical links of the switch having common aggregation keys, the current instance of the method 200 ends. Otherwise, the switch performs an operation 216 for aggregating physical links having a common aggregation key and performs an operation 218 for transmitting the respective link aggregation key for reception by the corresponding peer device via the respective physical link.

With respect to the method 200, it is disclosed herein that alternate sequences of operations can be performed, while still providing the same underlying self-configuring link aggregation functionality. For example, aggregating the physical links can be based on determining if Discovery Reply LACPDUs contain common system identifiers as opposed to first assigning the link aggregation keys and making such determination based on the link aggregation keys. Accordingly, a method for facilitating self-configuring link aggregation functionality in accordance with the present invention is limited to providing the desired outcome (i.e., facilitating self-configuring link aggregation) and is not unnecessarily limited to a particular set of operation and/or sequences thereof.

Based on the foregoing disclosures, a skilled person will now appreciate that the present invention simplifies link aggregation in the sense that a user does not need to manually configure ports of a switch with a common key to bundle them together to form a logical link. In accordance with the present invention, LACP works as both a neighbor discovery protocol and a link aggregation selection control protocol. As such, any new port added between neighboring devices (i.e., a switch and neighboring peer device) need not be manually configured, as it will be automatically configured to be included with an existing link aggregation based on exchange of LACPDUs between those neighboring devices.

Referring now to instructions processible by a data processing device, it will be understood from the disclosures made herein that methods, processes and/or operations adapted for carrying out self-configuring link aggregation functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out self-configuring link aggregation functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method allowing a switch to self-configure a logical connection corresponding to a plurality of physical links, comprising:

receiving Link Aggregation Control Protocol Data Units (LACPDUs) from a plurality of peer devices, wherein said receiving is performed by the switch connected via the plurality of physical links to each one of said peer devices, wherein each one of said LACPDUs includes a system identifier that uniquely identifies the respective peer device relative to each other peer device connected to the switch, and wherein the system identifier of each one of said peer devices is a globally unique identifier that is a concatenation of only a globally administered system address of a respective one of said peer devices and a system priority;

assessing the system identifier contained by each one of said LACPDUs for providing discovery of the respective peer device that sent each one of said LACPDUs, wherein providing said discovery includes uniquely identifies all ports of the switch that are connected to a given peer device and wherein all information carried by each one of said LACPDUs other than the system identifier is ignored during said discovery;

automatically assigning a link aggregation key to a physical link used by the switch for receiving a respective one of said LACPDUs in response to receiving each one of said LACPDUs, wherein assigning the link aggregation key is performed exclusively by the switch and wherein said assigning of the link aggregation key is based on the system identifier in the respective one of the LACPDUs;

enabling Link Aggregation Control Protocol (LACP) functionality on said all ports of said switch prior to receiving an of said LACPDUs wherein each one of said physical links includes a connection to the switch via one of said ports;

automatically disabling said LACP functionality on one of said ports in response to at least one of the switch not receiving one of said LACPDUs via said one port during a predefined duration of time, a link corresponding to said one port being administratively disabled, and the link corresponding to said one port being subjected to a link-down event; and automatically re-enabling said LACP functionality on said one port in response to at least one of the switch receiving one of said LACPDUs via said one port after the predefined duration of time expires, the link corresponding to said one port being administratively enabled, and the link corresponding to said one port being subjected to a link-up event.

2. The method of claim 1, further comprising:

transmitting each one of said LACPDUs for reception by a respective one of said peer devices, wherein the switch includes a first plurality of ports configured for facilitating communication with user devices and a second plurality of ports configured for facilitating communication with said peer devices, wherein each one of said physical links includes a connection to the switch via a respective one of said peer device ports such that said LACPDUs are transmitted exclusively via said peer device ports.

3. The method of claim 1, further comprising:

logically aggregating all of said physical links having common physical link identifiers, wherein said aggregating is automatically performed in response to a plurality of said physical links being assigned a common link aggregation key and wherein the common link aggregation key is assigned to the plurality of physical links in response to determining that the plurality of said physical links are connected to a common one of said peer devices.

4. The method of claim 3 wherein said aggregating includes transmitting the physical identifier for reception by said common peer device.

5. The method of claim 4, further comprising:

transmitting each one of said LACPDUs for reception by a respective one of said peer devices, wherein the switch includes a first plurality of ports configured for facilitating communication with user devices and a second plurality of ports configured for facilitating communication with said peer devices, wherein each one of said physical links includes a connection to the switch via a respective one of said peer device ports such that said LACPDUs are transmitted exclusively via said peer device ports.

6. The method of claim 3 wherein logically aggregating all of said physical links includes:
  determining that a plurality of logical link aggregations is required for logically aggregating all of said physical links assigned one of said link identifiers; and
  logically aggregating a first portion of said physical links on a first logical link aggregation; and
  logically aggregating a second portion of said physical links on a second logical link aggregation.

7. The method of claim 6 wherein logically aggregating all of said physical links includes:
  specifying designated ports of the switch that are configured for serving each one of said plurality of logical link aggregations.

8. The method of claim 6 wherein logically aggregating all of said physical links includes:
  specifying a maximum number of ports of the switch that are available for serving each one of said logical link aggregations;
  in response to a number of ports required for serving a particular one of said logical link aggregations exceeding the maximum number of said ports available for serving the particular one of said logical link aggregations when an unused port of the switch is available for serving the particular one of said logical link aggregations, assigning a new link aggregation key to a portion of said physical links corresponding to the particular one of said logical link aggregations, wherein the new aggregation key corresponds to a logical aggregation link served by the unused port; and
  logically aggregating all of said physical links assigned the new link aggregation key.

9. A method for causing a switch to self-configure a logical connection thereof corresponding to a plurality of physical links thereof, comprising:
  discovering active neighboring peer devices of the switch, wherein said discovering includes facilitating communication of Link Aggregation Control Protocol Data Units (LACPDUs) for identifying a unique system identifier assigned to each one of said neighboring peer devices, wherein the system identifier of each one of said peer devices is a globally unique identifier that is a concatenation of only a globally administered system address of a respective one of said peer devices and a system priority, wherein said discovering includes uniquely identifying all ports of the switch that are connected to a given peer device, and wherein all information carried by each one of said LACPDUs other than the system identifier is ignored during said discovering;
  in response to said discovering active neighboring peer devices, automatically assigning a link aggregation key to each one of the plurality of physical links over which the switch and one of said active neighboring peer devices communicate respective ones of said LACPDUs, wherein assigning the link aggregation key is performed exclusively by the switch and wherein the system identifier is the only information received by each one of said peer devices that is used for assigning the aggregation key;
  logically aggregating all of said physical links using the link aggregation key;
  enabling Link Aggregation Control Protocol (LACP) functionality on said all ports of said switch prior to receiving any of said LACPDUs, wherein each one of said physical links includes a connection to the switch via one of said ports;
  automatically disabling said LACP functionality on one of said ports in response to at least one of the switch not receiving one of said LACPDUs via said one port during a predefined duration of time, a link corresponding to said one port being administratively disabled, and the link corresponding to said one port being subjected to a link-down event; and
  automatically re-enabling said LACP functionality on said one port in response to at least one of the switch receiving one of said LACPDUs via said one port after the predefined duration of time expires, the link corresponding to said one port being administratively enabled, and the link corresponding to said one port being subjected to a link-up event.

10. The method of claim 9 wherein said aggregating includes transmitting the physical identifier for reception by said one active neighboring peer device.

11. The method of claim 9 wherein:
  communication of said LACPDUs includes receiving system-ID carrying LACPDUs from each one of said neighboring peer devices; and
  the link aggregation key uniquely identifies the switch and said one neighboring peer device.

12. The method of claim 11 wherein said aggregating includes transmitting the physical identifier for reception by said one active neighboring peer device.

13. A switch capable of self-configuring a logical connection thereof corresponding to a plurality of physical links thereof, the switch being configured for:
  discovering active neighboring peer devices of the switch, wherein said discovering includes facilitating communication of Link Aggregation Control Protocol Data Units (LACPDUs) for identifying a unique system identifier assigned to each one of said neighboring peer devices, wherein the system identifier of each one of said peer devices is a globally unique identifier that is a concatenation of only a globally administered system address of a respective one of said peer devices and a system priority, wherein said discovering includes uniquely identifying all ports of the switch that are connected to a given peer device, and wherein all information carried by each one of said LACPDUs other than the system identifier is ignored during said discovering;
  in response to said discovering said active neighboring peer devices, automatically assigning a link aggregation key to each one of the plurality of physical links over which the switch and one of said active neighboring peer devices communicate respective ones of said LACPDUs, wherein assigning the link aggregation key is performed exclusively by the switch and wherein the system identifier is the only information received by each one of said peer devices that is used for assigning the aggregation key;
  facilitating logical aggregation of all of said physical links using the link aggregation key;
  enabling Link Aggregation Control Protocol (LACP) functionality on said all ports of said switch prior to receiving any of said LACPDUs, wherein each one of said physical links includes a connection to the switch via one of said ports;
  automatically disabling said LACP functionality on one of said ports in response to at least one of the switch not receiving one of said LACPDUs via said one port during a predefined duration of time, a link corresponding to said one port being administratively disabled, and the link corresponding to said one port being subjected to a link-down event; and automatically re-enabling said LACP functionality on said one port in response to at least one of the switch receiving one of said LACPDUs via said one port after the predefined duration of time expires, the link corresponding to said one port being administratively enabled, and the link corresponding to said one port being subjected to a link-up event.

14. The switch of claim 13 wherein said aggregating includes transmitting the physical identifier for reception by said one active neighboring peer device.

15. The switch of claim 13 wherein:

communication of said LACPDUs includes receiving system-ID carrying LACPDUs from each one of said neighboring peer devices; and the link aggregation key uniquely identifies the switch and said one neighboring peer device.

16. The switch of claim 15 wherein said aggregating includes transmitting the physical identifier for reception by said one active neighboring peer device.

* * * * *